United States Patent
Gatman et al.

(10) Patent No.: US 10,604,647 B2
(45) Date of Patent: Mar. 31, 2020

(54) COMPOSITION AND METHOD FOR PRODUCING A TEXTURED ACRYLIC SURFACE

(71) Applicant: Aristech Surfaces LLC, Florence, KY (US)

(72) Inventors: Mark Gatman, Erlanger, KY (US); Scott LaFollette, Cincinnati, OH (US); Neil Caldwell, Erlanger, KS (US); Jeff Fields, Suwanee, GA (US)

(73) Assignee: Aristech Surfaces LLC, Florence, KY (US)

( * ) Notice: Subject to any disclaimer, the term of this patent is extended or adjusted under 35 U.S.C. 154(b) by 0 days.

(21) Appl. No.: 15/893,954

(22) Filed: Feb. 12, 2018

(65) Prior Publication Data

US 2018/0163042 A1  Jun. 14, 2018

Related U.S. Application Data

(63) Continuation-in-part of application No. 14/450,872, filed on Aug. 4, 2014, now abandoned.

(60) Provisional application No. 61/861,970, filed on Aug. 3, 2013.

(51) Int. Cl.

| | |
|---|---|
| *C08F 20/18* | (2006.01) |
| *C08L 33/06* | (2006.01) |
| *C08J 9/224* | (2006.01) |
| *C08K 5/00* | (2006.01) |
| *B32B 27/30* | (2006.01) |
| *C08L 69/00* | (2006.01) |
| *C08F 265/06* | (2006.01) |
| *C08F 220/18* | (2006.01) |

(52) U.S. Cl.
CPC .............. *C08L 33/06* (2013.01); *B32B 27/30* (2013.01); *B32B 27/308* (2013.01); *C08F 20/18* (2013.01); *C08F 220/18* (2013.01); *C08F 265/06* (2013.01); *C08J 9/224* (2013.01); *C08K 5/0025* (2013.01); *C08K 5/0075* (2013.01); *C08L 69/00* (2013.01); *B32B 2471/04* (2013.01); *C08F 2810/20* (2013.01); *C08J 2333/08* (2013.01); *C08J 2333/10* (2013.01)

(58) Field of Classification Search
CPC ... B32B 27/30; B32B 27/308; B32B 2471/04; C08K 5/00; C08K 5/0075; C08K 5/0025; C08L 33/06; C08L 69/00; C08L 33/08; C08L 2203/30; C08F 20/18; C08F 2810/20; C08J 9/224; C08J 2333/10; C08J 2333/08; B29C 51/002; B29C 51/02; B29K 2105/0014; B29K 2105/0085; B29K 2105/16; B29K 2105/256; B29K 2509/00; B29K 2995/0074; B29L 2007/001
See application file for complete search history.

(56) References Cited

U.S. PATENT DOCUMENTS

| | | | | |
|---|---|---|---|---|
| 5,073,587 | A * | 12/1991 | Edwards | C08F 2/44 524/166 |
| 6,077,575 | A * | 6/2000 | Minghetti | B29C 39/003 428/15 |
| 2013/0196148 | A1 * | 8/2013 | Shin | C04B 26/06 428/338 |

* cited by examiner

*Primary Examiner* — Nathan M Nutter

(74) *Attorney, Agent, or Firm* — Frost Brown Todd LLC

(57) ABSTRACT

A composition for making a cast, thermoformable sheet or slab, comprising: a syrup comprising: about 30-40% SSI—acrylic pre-polymerized syrup by weight at 20% solids; about 30-40% MMA—methyl methacrylate by weight; about 2-3% BA—Butyl acrylate by weight; about 1-15% by weight acrylic chips; and about 1-15% by weight rigid particles with a mean diameter of about 0.5-2000 μm. The rigid particles may preferably comprise a polymeric material such as poly allyl diglycol carbonate particles. A method for producing a thermoformed article having a textured surface comprising mixing the syrup as above; swelling the acrylic chips; degassing the syrup; heating the syrup; casting the syrup into a sheet; and thermoforming the cast sheet against a mold.

19 Claims, 1 Drawing Sheet

COMPOSITION AND METHOD FOR PRODUCING A TEXTURED ACRYLIC SURFACE

CROSS-REFERENCE TO RELATED APPLICATIONS

This application is a continuation-in-part application of U.S. application Ser. No. 14/450,872, filed on Aug. 4, 2014 and claiming priority from U.S. provisional patent application 61/861,970, filed on Aug. 3, 2013.

BACKGROUND

Field of the Disclosure

Certain acrylic or other plastic materials are currently utilized in the marketplace to produce non-slip surfaces for use in wet areas like pool steps or shower pans. Typically, these surfaces are produced by extruding a rough plastic surface, where the roughness is produced through the use of a "hair cell" or solid particulate added to the surface. In each case, the roughness of the material is present as soon as the product is manufactured, and in some cases the roughness will be lessened by subsequent manufacturing operations, like thermoforming.

Thus, there exists a need for a composition and method for producing an acrylic sheet material that if cast against a highly polished surface, once cool, such acrylic sheet will have a high gloss finish. However, if this sheet is thermoformed against a mold, the solid particulate will become prominent as the acrylic is stretched and thinned. This ultimately leaves a textured surface that can provide a nonslip surface when formulated according to preferred embodiments hereof.

SUMMARY OF THE DISCLOSURE

In a preferred aspect, the present disclosure comprises a composition for making a cast, thermoformable sheet or slab, comprising: a syrup comprising: about 30-40% SSI—Acrylic pre-polymerized syrup at 20% solids by weight; about 30-40% MMA—methyl methacrylate by weight; about 2-3% BA—Butyl acrylate by weight; about 1-15% acrylic chips by weight; and about 1-15% rigid particles by weight with a mean diameter of about 0.5-2000 nm.

In another preferred aspect, the rigid particles comprise a polymeric or inorganic material.

In yet another preferred aspect, the rigid particles comprise poly allyl diglycol carbonate.

In another preferred aspect, the syrup comprises: about 38% SSI—Acrylic pre-polymerized syrup at 20% solids by weight; about 38% MMA—methyl methacrylate by weight; about 3% BA—Butyl acrylate by weight; about 14% acrylic chips by weight; and about 7% rigid particles by weight with a mean diameter of about 0.5-2000 µm.

In yet another preferred aspect, the syrup further comprises one or more of an anti-flocculating agent; a pigment; a chain transfer agent; a release agent; a crosslinking agent and an initiator.

In another preferred aspect, the composition for making a cast, thermoformable sheet or slab, comprises: a syrup, comprising: about 37.7% SSI—Acrylic pre-polymerized syrup by weight at 20% solids; about 37.7% MMA—methyl methacrylate by weight; about 2.7% BA—Butyl acrylate by weight; about 0.3% of an anti flocculating agent by weight; about 0.1% by weight of a chain transfer agent; about 0.01% by weight of a release agent; about 0.2% by weight of a crosslinking agent; about 0.1-0.3% by weight of one or more initiators; about 14% by weight acrylic chips; and about 7% by weight rigid particles with a mean diameter of about 0.5-2000 µm. Here, the rigid particles may comprise poly allyl diglycol carbonate.

In another preferred aspect, the present disclosure comprises a method for producing a thermoformed article having a textured surface comprising: mixing a syrup comprising: about 30-40% SSI—Acrylic pre-polymerized syrup by weight at 20% solids, about 30-40% MMA—methyl methacrylate by weight, about 2-3% BA—Butyl acrylate by weight, about 1-15% acrylic chips by weight; and about 1-15% rigid particles by weight with a mean diameter of about 0.5-2000 µm; swelling the acrylic chips; degassing the syrup; heating the syrup; casting the syrup into a sheet; and thermoforming the cast sheet against a mold.

In yet another preferred aspect of the method of the present disclosure, the syrup is cast against a polished surface to produce a sheet having a gloss finish.

In another preferred aspect of the method of the present disclosure, the sheet having a gloss finish is thermoformed against the mold to produce the article.

In yet another preferred aspect of the method of the present disclosure, the article may have one or more textured surfaces and one or more glossy surfaces.

In another preferred aspect of the method of the present disclosure, the rigid particles comprise poly allyl diglycol carbonate.

In yet another preferred aspect of the method of the present disclosure, the rigid particles comprise poly allyl diglycol carbonate and about 7% by weight of the syrup.

In another preferred aspect of the method of the present disclosure, the syrup comprises: about 37.7% SSI—Acrylic pre-polymerized syrup by weight at 20% solids; about 37.7% MMA—methyl methacrylate by weight; about 2.7% BA—Butyl acrylate by weight; about 0.3% by weight of an anti flocculating agent; about 0.1% by weight of a chain transfer agent; about 0.01% by weight of a release agent; about 0.2% by weight of a crosslinking agent; about 0.1-0.3% by weight of one or more initiators; about 14% by weight acrylic chips; and about 7% by weight poly allyl diglycol carbonate particles with a mean diameter of about 0.5-2000 µm.

BRIEF DESCRIPTION OF THE DRAWING

The FIGURE is a perspective view of a textured surface of an acrylic sheet formed according to a preferred aspect of the present disclosure.

DETAILED DESCRIPTION OF PREFERRED EMBODIMENT(S) OF THE DISCLOSURE

In the following detailed description, reference is made to the accompanying examples and the FIGURE that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the teen "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

According to preferred embodiments of the present disclosure, rigid particles with a mean diameter of 0.5-2000 µm are added to cast acrylic in the liquid state, prior to polymerization into a solid sheet. These particles are added at a loading of 1-15% of the total weight of the sheet and can consist of either cross-linked polymer or inorganic materials. The key attributes are that the particles are rigid and not prone to stretching, and that they foam a bond with the acrylic polymer. Upon completion of the casting process, these sheets show no discernible difference from a standard sheet without particulate added. In a subsequent thereto-forming (heating and stretching) process the particulate filled sheets show a distinct texture that result in a rough, "non-slip" type of surface.

Preferred embodiments of the present disclosure use a rigid particulate added to cast acrylic in the pre-polymerized state. This particulate needs to be rigid, irregularly shaped, have the ability to bond with the acrylic, and not stretch significantly upon thermoforming. The particulate can range from 0.5-2000 µm with the size of the particles impacting the type of roughness. Larger particles create a rougher texture than smaller particles. Very small particles can give more of a matted or non-glossy surface. The concentration of the particles ranges from 1-15% with the volume of roughness being directly proportional to the concentration. A preferred embodiment of this present disclosure utilizes irregularly shaped particulate that can pass through a standard 40 mesh screen being added at about 7% by weight to a cast acrylic sheet The particulate itself can be any material that fits the criteria above. Preferably, different plastic and inorganic materials can be used to impart texture into thermoformed acrylic. The preferred embodiment is poly allyl diglycol carbonate, which is a thermoset plastic widely utilized for eyeglass lenses. Scrap eyeglass lens material is routinely ground and used for other purposes, like media blasting. Preferably, 40 mesh version of RES-N-SAND (a polymeric grit, texturizer and filler for use primarily in paints and other surface coating materials), provided by RJ Marshall provides suitable non-slip character without becoming too rough or sharp. This particulate is added at the formulation stage of the casting process with other acrylic chips, initiators, pigments, and cross-linkers. Once these ingredients are thoroughly mixed and any acrylic chips are fully swelled, they are placed under vacuum until all air is removed. The de-gassed "syrup" is then either poured into a cell or poured onto a continuous casting machine. Preferably, the mixture is heated to 185° F. using sprayed hot water for 20 minutes. Upon exiting the water bath, the cell is heated in a forced air ovens at 240° for 12 minutes. If cast against a highly polished surface, once cool, this acrylic sheet will have a high gloss finish. However, if this sheet is thermo-formed against a mold, the solid particulate will become prominent as the acrylic is stretched and thinned. This ultimately leaves a textured surface 10 as shown in the FIGURE that can provide a nonslip surface when formulated according to preferred embodiments hereof. Preferably, the material produced according to preferred embodiments of the present disclosure are useful for producing non-slip surfaces in cast or continuous cast acrylic sheets upon thermoforming. Potential commercial uses of this material are for the formation of pool steps, shower pans, or other applications where traction is important in wet use applications.

Formulation for Use in Production of a Textured Acrylic Surface

The following acrylic composition is preferred formulation of the present disclosure to produce a textured acrylic surface upon thermo-forming the acrylic composition into thermoformed sheets.

| BASE ACRYLIC FORMULA | % by weight |
| --- | --- |
| SSI - Acrylic pre-polymerized syrup at 20% solids | 37.67 |
| MMA - methyl methacrylate | 37.67 |
| BA - Butyl acrylate | 2.76 |
| JX-44 - Triisooctyl phosphate - Anti flocculating agent | 0.29 |
| Pigment | 0.79 |
| JX-1 - n-dodecyl mercaptan - Chain transfer agent | 0.11 |
| ZELEC UN - Release agent | 0.01 |
| JX-2 - ethylene glycol dimethacrylate - Crosslinking agent | 0.17 |
| BRB-4 - t-butyl peroxypivalate - Initiator | 0.11 |
| BRB-6 - t-butyl peroxyneodecanoate - Initiator | 0.11 |
| BRB-8 - t-amyl peroxy-2-ethyl-hexanoate - Initiator | 0.11 |
| I3C 7301 - Acrylic Chips | 1.15 |
| I3C 7300 - Acrylic Chips | 2.30 |
| I3C 7305 - Acrylic Chips | 10.33 |
| RES-N-SAND ULTRA 40 (CR-39) chips | 6.43 |

The above baseline formula would account for 100% total weight of the total batch.

RES-N-SAND ULTRA 40 (a polymeric grit, texturizer and filler for use primarily in paints and other surface coating materials) chips provided by RJ Marshall are chips made from scrap eyeglass (CR-39) lenses. Typical size distribution of the chips is as follows:

| Mesh | Weight Percent |
| --- | --- |
| −12 + 20 | 0.0 |
| −20 + 30 | 9.5 |
| −30 + 40 | 48.0 |
| −100 | 37.0 |
| −100 + 200 | 5.6 |
| −200 + 325 | 0.0 |
| −325 Pan | 0.0 |

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A composition for making a cast, thermoformable sheet or slab, providing a nonslip surface, comprising: a syrup comprising:
    a) about 30-40% Acrylic pre-polymerized syrup by weight at 20% solids;
    b) about 30-40% MMA—methyl methacrylate by weight;
    c) about 2-3% BA—Butyl acrylate by weight;
    d) about 1-15% acrylic chips by weight; and
    e) about 1-15% rigid particles, by weight,
wherein the rigid particles comprise poly allyl diglycol carbonate, with a mean diameter of about 0.5-2000 µm.

2. The composition of claim 1 wherein the syrup comprises:
   a. about 38% Acrylic pre-polymerized syrup at 20% solids by weight;
   b. about 38% MMA—methyl methacrylate by weight;
   c. about 3% BA—Butyl acrylate by weight;
   d. about 14% acrylic chips by weight; and
   e. about 7% rigid particles, by weight with a mean diameter of about 0.5-2000 μm.

3. The composition of claim 1 wherein the syrup further comprises one or more of an anti-flocculating agent; a pigment; a chain transfer agent; a release agent; a crosslinking agent and an initiator.

4. The composition of claim 1 wherein the syrup further comprises one or more of an anti-flocculating agent; a pigment; a chain transfer agent; a release agent; a crosslinking agent and an initiator.

5. A composition for making a cast, thermoformable sheet or slab, providing a nonslip surface, comprising: a syrup, comprising:
   a) about 37.7% Acrylic pre-polymerized syrup by weight at 20% solids;
   b) about 37.7% MMA—methyl methacrylate by weight;
   c) about 2.7% BA—Butyl acrylate by weight;
   d) about 0.3%, by weight, of an anti flocculating agent;
   e) about 0.1%, by weight, of a chain transfer agent;
   f) about 0.01%, by weight, of a release agent;
   g) about 0.2%, by weight, of a crosslinking agent;
   h) about 0.1-0.3%, by weight, of one or more initiators;
   i) about 14% acrylic chips, by weight; and
   j) about 7% rigid particles, by weight,
wherein the rigid particles comprise poly allyl diglycol carbonate, with a mean diameter of about 0.5-2000 μm.

6. A method for producing a thermoformed article having a textured surface by mixing a syrup comprising:
   a) about 30-40% Acrylic pre-polymerized syrup by weight at 20% solids;
      about 30-40% MMA—methyl methacrylate by weight;
      about 2-3% BA—Butyl acrylate by weight;
      about 1-15% acrylic chips by weight; and
      about 1-15% rigid particles, by weight,
   wherein the rigid particles comprise poly allyl diglycol carbonate, with a mean diameter of about 0.5-2000 μm;
   b) swelling the acrylic chips;
   c) degassing the syrup;
   d) heating the syrup;
   e) casting the syrup into a sheet; and
   f) thermoforming the cast sheet against a mold.

7. The method of claim 6 wherein the syrup is cast against a polished surface to produce a sheet having a gloss finish.

8. The method of claim 7 wherein the sheet having a gloss finish is thermoformed against the mold to produce the article.

9. The method of claim 8 wherein the article has one or more textured surfaces and one or more glossy surfaces.

10. The method of claim 6 wherein the rigid particles comprise poly allyl diglycol carbonate.

11. The method of claim 6 wherein the rigid particles comprise poly allyl diglycol carbonate and about 7% of the syrup.

12. The method of claim 6 wherein the syrup comprises:
   a) about 37.7% Acrylic pre-polymerized syrup at 20% solids;
   b) about 37.7% MMA—methyl methacrylate;
   c) about 2.7% BA—Butyl acrylate;
   d) about 0.3% of an anti flocculating agent;
   e) about 0.1% of a chain transfer agent;
   f) about 0.01% of a release agent;
   g) about 0.2% of a crosslinking agent;
   h) about 0.1-0.3% of one or more initiators;
   i) about 14% acrylic chips; and
   j) about 7% poly allyl diglycol carbonate particles with a mean diameter of about 0.5-2000 μm.

13. A method for producing a thermoformed article having a textured surface by the steps of:
   a) providing the syrup of claim 1;
   b) swelling the acrylic chips;
   c) degassing the syrup;
   d) heating the syrup;
   e) casting the syrup into a sheet; and
   f) thermoforming the cast sheet against a mold.

14. The method of claim 13 wherein the syrup is cast against a polished surface to produce a sheet having a gloss finish.

15. The method of claim 14 wherein the sheet having a gloss finish is thermoformed against the mold to produce the article.

16. The method of claim 15 wherein the article has one or more textured surfaces and one or more glossy surfaces.

17. The method of claim 13 wherein the rigid particles comprise poly allyl diglycol carbonate.

18. The method of claim 13 wherein the rigid particles comprise poly allyl diglycol carbonate and about 7% of the syrup.

19. The method of claim 13 wherein the syrup comprises:
   a) about 37.7% Acrylic pre-polymerized syrup at 20% solids;
   b) about 37.7% MMA—methyl methacrylate;
   c) about 2.7% BA—Butyl acrylate;
   d) about 0.3% of an anti flocculating agent;
   e) about 0.1% of a chain transfer agent;
   f) about 0.01% of a release agent;
   g) about 0.2% of a crosslinking agent;
   h) about 0.1-0.3% of one or more initiators;
   i) about 14% acrylic chips; and
   j) about 7% poly allyl diglycol carbonate particles with a mean diameter of about 0.5-2000 μm.

* * * * *